(12) United States Patent
Willis et al.

(10) Patent No.: US 9,097,130 B2
(45) Date of Patent: Aug. 4, 2015

(54) SEAL FOR USE BETWEEN INJECTOR AND COMBUSTION CHAMBER IN GAS TURBINE

(75) Inventors: Christopher Paul Willis, Liberty, SC (US); Richard Martin DiCintio, Simpsonville, SC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 13/614,114

(22) Filed: Sep. 13, 2012

(65) Prior Publication Data

US 2014/0069103 A1    Mar. 13, 2014

(51) Int. Cl.
| F01D 11/02 | (2006.01) |
| F23R 3/28 | (2006.01) |
| F23R 3/34 | (2006.01) |
| F01D 11/00 | (2006.01) |
| F23R 3/00 | (2006.01) |

(52) U.S. Cl.
CPC .............. *F01D 11/005* (2013.01); *F23R 3/002* (2013.01); *F23R 3/283* (2013.01); *F05D 2250/75* (2013.01); *F05D 2260/38* (2013.01); *F23R 3/34* (2013.01); *F23R 2900/00012* (2013.01); *F23R 2900/03042* (2013.01); *Y02E 20/16* (2013.01)

(58) Field of Classification Search
CPC .. F23R 3/283; F23R 2900/00012; F23R 3/34; F23R 3/346; F23R 2900/03042; F02C 7/28; F02C 7/20; F01D 11/005; F23D 2900/14001; F05D 2260/38; F05D 2250/75
USPC ..................................... 60/800; 277/422, 412
See application file for complete search history.

(56) References Cited

U.S. PATENT DOCUMENTS

| 3,879,940 | A | * | 4/1975 | Stenger et al. | 60/737 |
| 4,365,470 | A | * | 12/1982 | Matthews et al. | 60/800 |
| 5,749,219 | A | * | 5/1998 | DuBell | 60/804 |
| 6,351,949 | B1 | * | 3/2002 | Rice et al. | 60/752 |
| 6,453,675 | B1 | * | 9/2002 | Royle | 60/800 |
| 6,880,341 | B2 | | 4/2005 | Parkman et al. | |
| 7,000,396 | B1 | * | 2/2006 | Storey | 60/752 |
| 7,140,189 | B2 | * | 11/2006 | Markarian et al. | 60/796 |
| 7,640,752 | B2 | * | 1/2010 | Gautier et al. | 60/796 |
| 7,690,207 | B2 | * | 4/2010 | Markarian et al. | 60/796 |
| 7,827,800 | B2 | * | 11/2010 | Stastny et al. | 60/752 |
| 7,861,530 | B2 | * | 1/2011 | Hawie et al. | 60/752 |
| 7,946,119 | B2 | * | 5/2011 | Geary | 60/796 |
| 8,056,232 | B2 | * | 11/2011 | Patel et al. | 29/890.142 |
| 8,099,963 | B2 | * | 1/2012 | Pieussergues et al. | 60/800 |

(Continued)

FOREIGN PATENT DOCUMENTS

JP        2009236479 A    10/2009

*Primary Examiner* — William H Rodriguez
*Assistant Examiner* — Jason H Duger
(74) *Attorney, Agent, or Firm* — Ernest G. Cusick; Hoffman Warnick LLC

(57) ABSTRACT

A seal assembly for use between an injector and a combustion chamber in a gas turbine. A liner at least partially defines the combustion chamber, and the liner has at least one tubular liner collar, through which an injector is inserted. In one embodiment, the liner collar has a partially convex outer diameter and a floating collar is positioned at least partially around the liner collar. The floating collar has a retention member having a first end fixed to the floating collar and a second end configured to abut the convex outer diameter of liner collar, wherein the retention member maintains the floating collar at a radial distance from the injector less than a radial distance between the liner collar and the injector.

12 Claims, 2 Drawing Sheets

(56) References Cited

U.S. PATENT DOCUMENTS

| | | |
|---|---|---|
| 8,104,291 B2 | 1/2012 | Myers et al. |
| 8,601,820 B2 * | 12/2013 | Byrne et al. .................... 60/754 |
| 8,726,631 B2 * | 5/2014 | Rudrapatna et al. ........ 60/39.821 |
| 2013/0104553 A1 * | 5/2013 | Stoia et al. ..................... 60/740 |

* cited by examiner

SEAL FOR USE BETWEEN INJECTOR AND COMBUSTION CHAMBER IN GAS TURBINE

BACKGROUND OF THE INVENTION

The subject matter disclosed herein relates to gas turbines and, more particularly, to a seal for use between an injector and a combustion chamber in a gas turbine.

A gas turbine will typically include multiple injectors to mix air and fuel in a combustion portion of the gas turbine. Injectors that are positioned downstream in the combustion chamber are referred to as Late Lean Injectors (LLI). There is typically considerable transient movement between injectors and the combustion chamber, and liners are typically used where the injectors enter the combustion chamber. To reduce leakage between injectors and liners, floating collars can be used, however due to relatively large injectors and tight space requirements, a floating collar with a traditional lead in feature is not possible. Inverting the lead in feature could cause the injector to load against the floating collar ferrule rather than the liner collar.

In addition, a gap is typically desired to be maintained between an injector and a liner for manufacturing and assembly reasons. Therefore, simply tightening the tolerances between the injector and the liner to reduce leakage is not feasible.

BRIEF DESCRIPTION OF THE INVENTION

Aspects of the invention include seal assemblies for use between an injector and a combustion chamber of a gas turbine is disclosed. A liner at least partially defines the combustion chamber, and the liner has at least one tubular liner collar through which an injector is inserted. In one embodiment, the liner collar has a partially convex outer diameter and a floating collar is positioned at least partially around the liner collar. The floating collar has a retention member having a first end fixed to the floating collar and a second end configured to abut the convex outer diameter of liner collar, wherein the retention member maintains the floating collar at a radial distance from the injector, less than a distance between the liner collar and the injector. In a second embodiment, a washer/spring assembly is used to maintain two washers at a radial distance from the injector, less than a radial distance between the liner collar and the injector. The washer/spring assembly can include a spring positioned between two washers, wherein the spring acts to press one washer against an upper surface of the liner collar and to press another washer against a flow sleeve positioned around the liner.

A first aspect of the disclosure provides a seal assembly comprising: a liner at least partially defining a combustion chamber of a gas turbine, the liner having at least one tubular liner collar through which an injector is inserted, wherein the liner collar has a partially convex outer diameter; a floating collar positioned at least partially around the liner collar; and a retention member having a first end fixed to the floating collar and a second end configured to abut the convex outer diameter of the liner collar, wherein the retention member maintains the floating collar at a radial distance from the injector less than a radial distance between an inner diameter of the liner collar and the injector.

A second aspect of the disclosure provides a seal assembly comprising: a liner at least partially defining a combustion chamber of a gas turbine, the liner having at least one tubular liner collar through which an injector is inserted; a flow sleeve positioned around the liner such that a annular passage is formed between the flow sleeve and the liner; and a washer spring assembly positioned between the liner collar and the flow sleeve, wherein the washer spring assembly comprises: a spring positioned between two washers, wherein the spring acts to press one washer against a surface of the liner collar and to press a another washer against the flow sleeve, wherein the washer spring assembly maintains the two washers at a radial distance from the injector less than a radial distance between an inner diameter of the liner collar and the injector.

A third aspect of the disclosure provides a gas turbine, comprising: at least one injector; a combustion chamber; a seal assembly between the at least one injector and the combustion chamber, comprising: a liner at least partially defining the combustion chamber, the liner having at least one tubular liner collar through which the at least one injector is inserted, wherein the liner collar has a partially convex outer diameter; a floating collar positioned at least partially around the liner collar; and a retention member having a first end fixed to the floating collar and a second end configured to abut the convex outer diameter of the liner collar, wherein the retention member maintains the floating collar at a radial distance from the at least one injector less than a radial distance between an inner diameter of the liner collar and the at least one injector.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
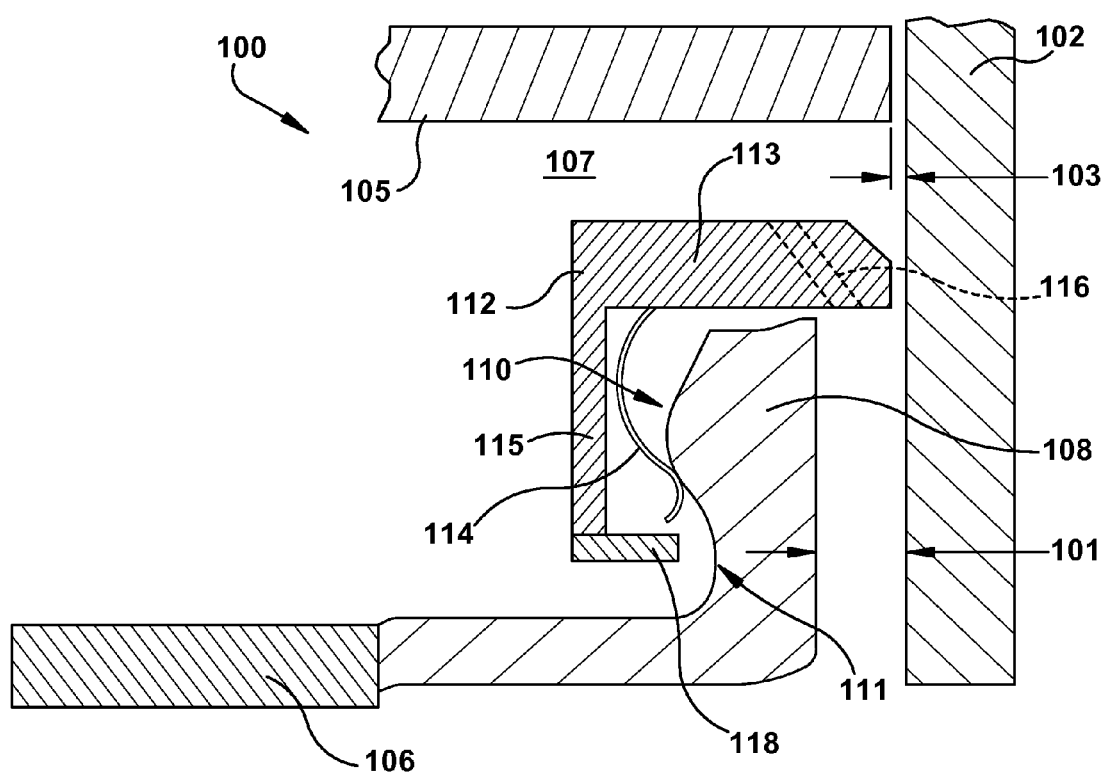
FIG. 1 shows a cross-sectional schematic of a seal assembly according to one embodiment of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for systems and devices configured to minimize leakage between an injector inserted into a combustion chamber while also allowing for easy assembly of the injectors circumferentially positioned around the combustion chamber. Aspects of the invention provide adequate sealing between the injector and a liner at least partially defining the combustion chamber through the use of a floating collar, while allowing for an increased gap between a liner collar and the injector to aid in assembly. The seal assemblies disclosed herein also provide radial and axial damping between the injector and the liner collar.

Turning to FIG. 1, a seal assembly 100 according to one embodiment of the invention is shown. Seal assembly 100 is shown in FIG. 1 in use for sealing between an injector 102 and a combustion chamber 104, e.g., of a gas turbine. In one embodiment, a substantially tubular liner 106 at least partially defines a cylindrical combustion chamber 104. A tubular flow sleeve 105 can also be positioned around liner 106. Flow sleeve 105 can be spaced away from liner 106 such that an annular flow passage 107 is defined between flow sleeve 105 and liner 106. Coolant, e.g., air, can be used in flow passage 107 as desired. It is understood that liner 106 refers to any element that defines a combustion chamber, for example, a single liner can be used, or a combination of a liner and a transition piece. Seal assembly 100 described herein can be used in connection with either a single liner or a liner/transition piece configuration.

As shown in FIG. 1, liner 106 has at least one tubular collar portion 108 (referred to as a liner collar) through which injector 102 is inserted into combustion chamber 104. It is understood that a plurality of liner collars 108 and a plurality of injectors 102 can be included, circumferentially positioned around combustion chamber 104, each injector 102 inserted into combustion chamber 104 through a liner collar 108. One such liner collar 108 and one corresponding injector 102 are shown in FIG. 1. Liner collar 108 has a substantially uniform inner diameter proximate to injector 102, forming a tubular hole through which injector 102 is inserted. As known in the art, a gap 101 exists between an inner diameter of injector 102 and liner collar 108, for manufacturing and assembly reasons. Gap 101 typically needs to be wide enough to allow a plurality of injectors 102 (circumferentially positioned around combustion chamber 104) to be aligned so as to be inserted through liner collars 108 (also circumferentially positioned around combustion chamber 104). If gap 101 is too narrow, it becomes more difficult to manufacture the components to be assembled with tight tolerances. However, while a wide gap 101 is desirable for manufacturing and assembly reasons, leakage through gap 101 needs to be controlled. The embodiments of the invention disclosed herein provide sealing assemblies 100, 200 that provide adequate sealing between injector 102 and liner 106.

In one embodiment, shown in FIG. 1, seal assembly 100 includes a floating collar 112 for each injector 102. Floating collar 112 maintains a narrower gap 103 between floating collar 112 and injector 102 than gap 101 between liner collar 108 and injector 102. Gap 103 can be controlled tighter than gap 101 because each floating collar 112 is independent of other circumferentially positioned floating collars 112 and injectors 102, and thus does not need the added tolerance required for alignment that liner 106 requires. Controlling and minimizing gaps 103 at each injector 102 allows for optimal leakage at this location, reducing emissions and losses in the system.

As shown in FIG. 1, liner collar 108 has an outer diameter 110/111, and at least a portion of outer diameter 110/111 is convex, i.e., curved outward portion 110. Curved outer diameter 110 of liner collar 108 can be achieved by machining an existing diameter of a liner collar 108, or by adding a boss or additional material on to liner collar 108 to achieve a curved, convex, shape. As shown in FIG. 1, in one embodiment, outer diameter 110/111 of liner collar 108 can be substantially S-shaped, i.e., an S-shaped formed by a convex portion 110 connected to a concave portion 111.

Floating collar 112 is positioned at least partially around liner collar 108 of liner 106. Floating collar 112 can be made of a robust material or a compliant material, as desired, and can comprise a one-piece or a multi-piece assembly. In addition to the functions discussed herein, floating collar 112 acts to block air from moving between gap 101 between liner collar 108 and injector 102. In one embodiment, floating collar 112 has a first portion 113 substantially perpendicular to injector 102 (and therefore substantially parallel to liner 106 defining combustion chamber 104) and a second portion 115 substantially parallel to injector 102 (and therefore substantially perpendicular to liner 106 defining combustion chamber 104). First portion 113 extends towards injector 102 and creates a narrower gap 103 (as compared to gap 101) as shown in FIG. 1.

Seal assembly 100 further includes a retention member 114 having a first end fixed to floating collar 112 and a second end configured to abut convex outer diameter 110 of liner collar 108 of liner 106. Retention member 114 maintains floating collar 112 at a known radial distance from injector 102. In this way, gap 103 between collar 112 and injector 102 can be controlled such that it is a known value, e.g., gap 103 has a radial distance less than a radial distance of gap 101 between an inner diameter of liner collar 108 and injector 102.

In one embodiment, retention member 114 is substantially S-shaped, with an apex of one curved portion abutting liner collar 108. It is understood that retention member 114 can be any shape or size that can act as a spring to exert force against liner collar 108 as necessary to retain floating collar 112 in position. Retention member 114 can contact liner collar 108 at any point on the S-shaped outer diameter 110/111 of liner collar 108 such that retention member 114 releasably "hooks" under curved portion 110 to lock floating collar 112 into place. For example, S-shaped retention member 114 can mate with S-shaped outer diameter 110/111. In this way, retention member 114 acts to hold collar 112 in place during assembly and operation, while maintaining a tighter seal between injector 102 and liner collar 108 than would be achievable without a collar due to assembly alignment concerns. Retention member 114 also provides radial and axial damping between liner collar 108, collar 112, and injector 102.

In one embodiment, a portion of the floating collar 112 proximate to injector 102 can include at least one hole 116 therethrough. Hole(s) 116 can be included to allow air to pass through floating collar 112. For example, hole(s) 116 can be included to allow air to pass through in order to cool seal assembly 100 or to vent seal assembly 100 as desired.

In one embodiment, floating collar 112 includes a second retention member 118. As shown in FIG. 1, second retention member 118 can extend orthogonally from second portion 115 of floating collar 112. Second retention member 118 has a first end fixed to floating collar 112, and a second end extending towards liner collar 108, specifically concave portion 111 of outer diameter of liner collar 108. In this way, second retention member 118 acts to limit movement of floating collar 112, i.e., movement of floating collar 112 towards and away from combustion chamber 104.

Figure 2:
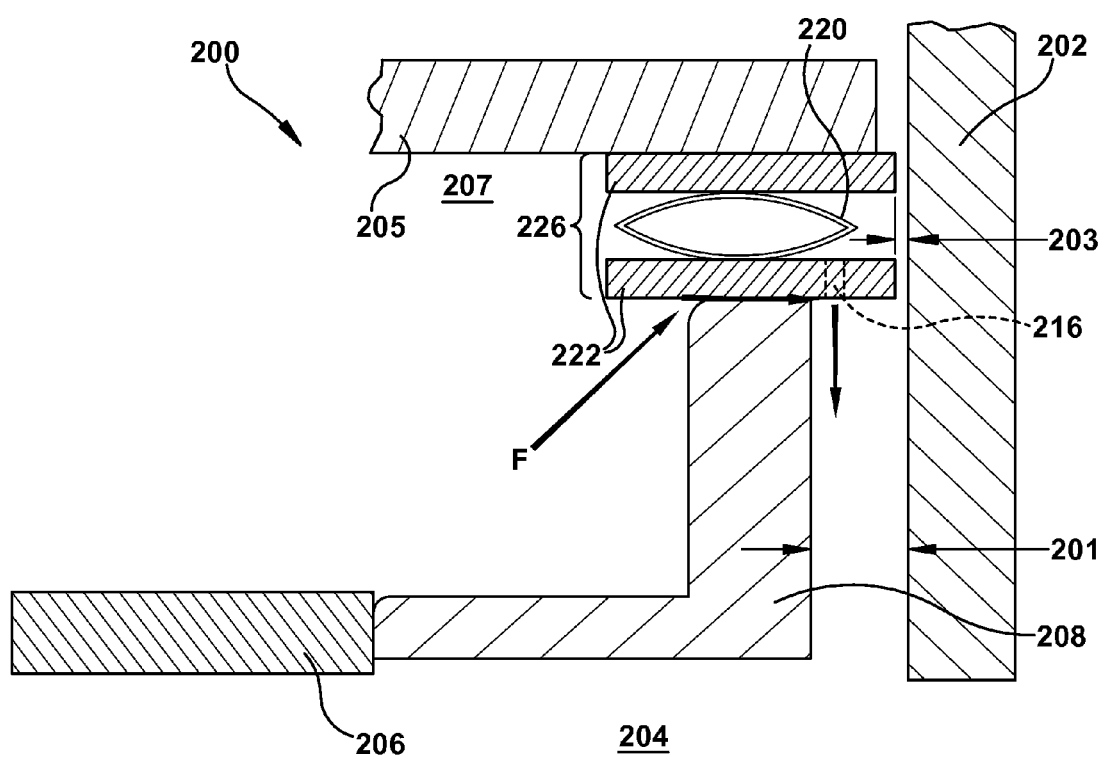
FIG. 2 shows a cross-sectional schematic of a seal assembly according to second embodiment of the invention.

Turning to FIG. 2, a seal assembly 200 according to another embodiment of the invention is shown. Similar to the configuration of seal assembly 100 shown in FIG. 1, seal assembly 200 is shown in FIG. 2 in use for sealing between an injector 202 and a combustion chamber 204, e.g., of a gas turbine. In one embodiment, a substantially tubular liner 206 at least partially defines a cylindrical combustion chamber 204. A tubular flow sleeve 205 can also be positioned around liner 206. Flow sleeve 205 can be spaced away from liner 206 such that an annular flow passage 207 is defined between flow sleeve 205 and liner 206. Coolant, e.g., air, can be used in flow passage 207 as desired. It is understood that liner 206 refers to any element that defines a combustion chamber, for example, a single liner can be used, or a combination of a liner and a transition piece, referred to as a unibody, as known in the art. Seal assembly 200 described herein can be used in connection with either a single liner or a unibody configuration.

Liner 206 has at least one tubular liner collar 208 through which injector 202 is inserted into combustion chamber 204. Liner collar 208 has a substantially uniform inner diameter proximate to injector 202, forming a tubular hole through which injector 202 is inserted. Gap 201 exists between injector 202 and an inner diameter of liner collar 208, for manufacturing and assembly reasons. It is understood that a plurality of injectors 202 can be included, circumferentially positioned around combustion chamber 204, each injector 202 inserted into combustion chamber 104 through a corresponding liner collar 208.

Seal assembly 200 further includes a spring washer assembly 226. Spring washer assembly 226 includes two seal washers 222 positioned between an upper surface (i.e., a surface substantially parallel to liner 106) of liner collar 208 and flow sleeve 205. Spring washer assembly 226 further includes a spring 220, for example, a wave spring, is positioned between seal washers 222. Spring 220 acts to press washers 222 against liner collar 208 and flow sleeve 205, respectively, thus maintaining spring/washer assembly 226 in position. Thus, a narrower gap 203 can be created between spring/washer assembly 226 and injector 102, than gap 201 between liner collar 208 and injector 102. Specifically, washer spring assembly 226 maintains washers 222 at a radial distance from injector 202 that is less than a radial distance between an inner diameter of liner collar 208 and injector 202.

Spring/washer assembly 226 maintains contact between liner collar 208 and washers 222, allowing for a controlled amount of leakage between liner collar 208 and injector 202 at gap 203. In addition, maintaining washer 222 against liner collar 208 acts to minimize air leakage flow (illustrated by arrows F in FIG. 2) that could flow past liner collar 208 and through gap 201 if washer/spring assembly 226 was not included.

In one embodiment, washers 222 can have a curvature corresponding to a curvature of flow sleeve 205 and/or liner collar 208.

In one embodiment, one or both washers 222 can have at least one hole 216 therethrough, proximate to injector 202. Hole(s) 216 can be included to allow air to pass through washers 222. For example, hole(s) 216 can be included to allow air to pass through in order to cool seal assembly 200 or to vent seal assembly 200 as desired.

In one embodiment, injectors 102, 202 comprise late lean injectors (LLI), i.e., an injector 102, 202 that is positioned in a downstream portion of combustion chamber 104, 204. However, it is understood that seal assemblies 100, 200 are not limited to LLI applications, and can be used to seal any injector assembly.

The seal assembly systems and devices of the present disclosure are not limited to any one particular rotary machine, turbine, generator, power generation system or other system, and may be used with other power generation systems and/or systems (e.g., combined cycle, simple cycle, nuclear reactor, etc.). Additionally, the seal assembly systems and devices of the present invention may be used with other systems not described herein that may benefit from the separation and protection of the seal assembly systems and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly comprising:
   a liner at least partially defining a combustion chamber of a gas turbine, the liner having at least one tubular liner collar through which an injector is inserted, wherein the at least one tubular liner collar has a partially convex outer diameter;
   a floating collar positioned at least partially around the at least one tubular liner collar; and
   a retention member having a first end fixed to the floating collar and a second end configured to abut the partially convex outer diameter of the at least one tubular liner collar, wherein the retention member maintains the floating collar at a radial distance from the injector less than a radial distance between an inner diameter of the at least one tubular liner collar and the injector, and wherein the retention member is S-shaped, with at least one curved portion abutting the at least one tubular liner collar.

2. The seal assembly of claim 1, wherein a portion of the floating collar proximate to the injector includes at least one hole therethrough, the at least one hole configured to allow air to pass through the floating collar.

3. The seal assembly of claim 1, wherein the floating collar includes a second retention member, the second retention member including a first end fixed to the floating collar, and a second end extending towards the at least one tubular liner collar.

4. The seal assembly of claim 1, wherein the partially convex outer diameter of the at least one tubular liner collar is S-shaped.

5. The seal assembly of claim 1, wherein the injector is a late lean injector positioned in a downstream portion of the combustion chamber.

6. The seal assembly of claim 1, further comprising a flow sleeve positioned around the liner such that an annular passage is formed between the flow sleeve and the liner, and wherein the floating collar is positioned between the at least one tubular liner collar and the flow sleeve.

7. A gas turbine, comprising:
   at least one injector;
   a combustion chamber;
   a seal assembly between the at least one injector and the combustion chamber, comprising:
   a liner at least partially defining the combustion chamber, the liner having at least one tubular liner collar through which the at least one injector is inserted, wherein the at least one tubular liner collar has a partially convex outer diameter;
   a floating collar positioned at least partially around the at least one tubular liner collar; and
   a retention member having a first end fixed to the floating collar and a second end configured to abut the partially convex outer diameter of the at least one tubular liner collar, wherein the retention member maintains the floating collar at a radial distance from the at least one injector less than a radial distance between an inner diameter of the at least one tubular liner collar and the at least one injector, and wherein the retention member is S-shaped, with at least one curved portion abutting the at least one tubular liner collar.

8. The gas turbine of claim 7, wherein a portion of the floating collar proximate to the at least one injector includes at least one hole therethrough, the at least one hole configured to allow air to pass through the floating collar.

9. The gas turbine of claim 7, wherein the floating collar includes a second retention member, the second retention member including a first end fixed to the floating collar, and a second end extending towards the at least one tubular liner collar.

10. The gas turbine of claim 7, wherein the partially convex outer diameter of the at least one tubular liner collar is S-shaped.

11. The gas turbine of claim 7, wherein the at least one injector is a late lean injector positioned in a downstream portion of the combustion chamber.

12. The gas turbine of claim 7, further comprising a flow sleeve positioned around the liner such that an annular passage is formed between the flow sleeve and the liner, and wherein the floating collar is positioned between the at least one tubular liner collar and the flow sleeve.

\* \* \* \* \*